United States Patent [19]
Malin

[11] 3,915,038
[45] Oct. 28, 1975

[54] FIBER BOARD CUTTER
[76] Inventor: Walter Malin, 10141 NW. 36 St., Coral Springs, Fla. 33060
[22] Filed: Oct. 9, 1973
[21] Appl. No.: 404,706

[52] U.S. Cl. .................. 83/3; 83/5; 83/425.4; 93/58.2 R
[51] Int. Cl.² ............................................ B26D 3/06
[58] Field of Search .......... 83/5, 425.4, 425.2, 475, 83/498, 499, 502, 3; 93/58.1, 58.2 R

[56] References Cited
UNITED STATES PATENTS

| | | |
|---|---|---|
| 667,055 | 1/1901 | Andersen ............................ 83/5 X |
| 1,805,688 | 5/1931 | Davis ................................. 83/924 X |
| 1,940,106 | 12/1933 | Snyder ................................ 83/5 X |
| 1,967,262 | 7/1934 | Robinson et al. .................... 83/5 X |
| 2,335,767 | 11/1943 | Kinports ............................. 83/5 X |
| 3,242,780 | 3/1966 | Ried et al. ........................... 83/5 |
| 3,369,433 | 2/1968 | Johansson ........................... 83/3 |
| R13,043 | 11/1909 | Klein .................................. 83/5 X |

*Primary Examiner*—Frank T. Yost

[57] ABSTRACT

A portable mechanical grooving apparatus for fiberglass duct utilizes thin rolling disk knives to cut all necessary grooves in just one pass of the fiberglass duct raw material. Fiberglass duct material in sheet form fed into a transverse slot opening of the machine is driven by roller drives through a series of locking, adjustable preset rolling disk knives which cut the material to size and groove the material to proper inside-duct dimensions. While being grooved by said rolling disk knives, excess fiberglass is ejected from the work for easy removal by hand. Simultaneously, as the fiberglass sheet is grooved, rolling disc knives along both left and right material edges form shiplaps which are used to hold the finished duct together.

3 Claims, 6 Drawing Figures

U.S. Patent  Oct. 28, 1975  Sheet 1 of 2  3,915,038
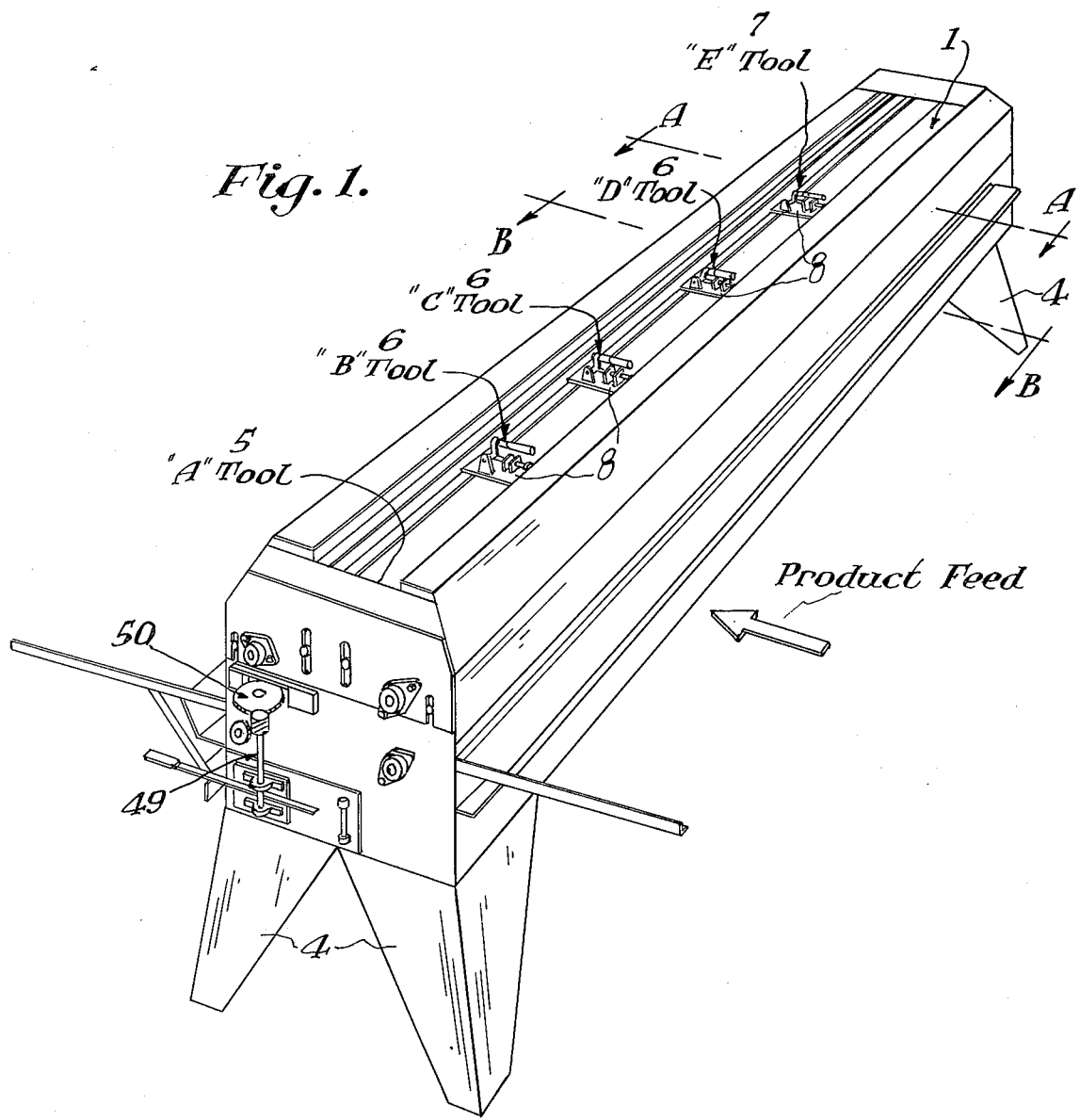
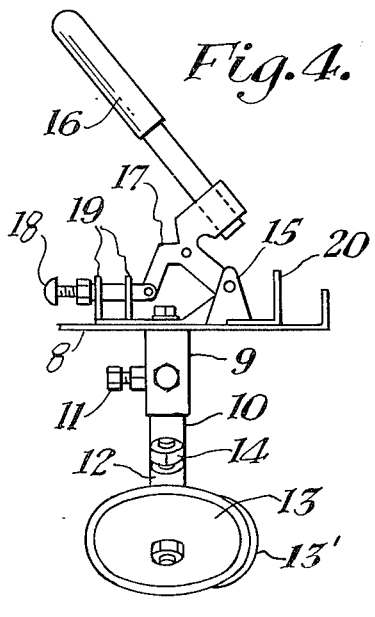
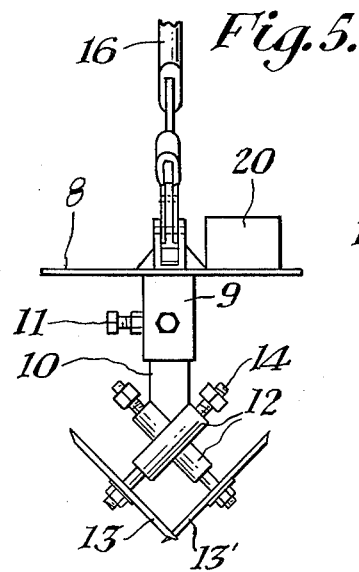
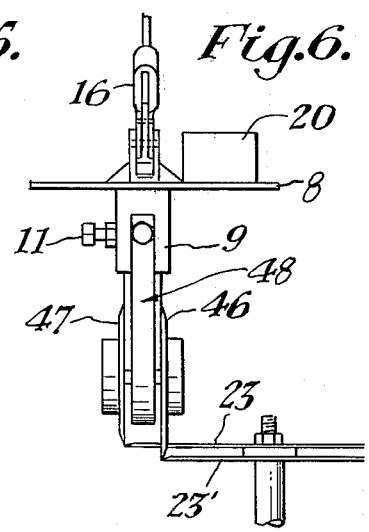

FIBER BOARD CUTTER

Background of the Invention

This invention relates to a portable device used to fabricate fiberglass duct for air distribution systems.

Fiberglass duct is used in air distribution systems due to its lightweight and good insulating properties. The construction of air duct from fiberglass requires cutting grooves in the sheet fiberglass stock in order to break this stock into square, rectangular or approximately round shapes as required. In addition the fiberglass stock must be grooved along two opposite edges to provide joints for sealing the final assembly.

Heretofore, most devices used to fabricate fiberglass duct have required several passes of the fiberglass stock through the machine in order to make all the necessary grooves. Moreover, the relatively thick juxtaposed blades of previous devices have caused shredding of the fiberglass stock which results in undesirable dust generation. As the oppositely opposed blades of these devices wear down, the fiberglass is not cut completely to the apex of the grooves. Material then must be scraped out or cut out by hand before the finished duct may be assembled.

Summary of the Invention

Therefore, to overcome the foregoing difficulties of the prior art, the general object of this invention is to provide a device for clean, high speed, precise fabrication of fiberglass air duct. To this end rollers located both above and below a transverse horizontal slot are in communication with the fiberglass sheet stock as it is hand-fed into the machine. The bottom rollers which are the driven rollers are located both ahead of and aft of the rolling disc knives in order to insure constant tension on the fiberglass stock as it moves through the machine. The upper rollers similarly located before and aft of the rolling disc knives are held against the fiberglass stock by spring pressure which in turn forces the stock against the driven rollers on the underside of the stock.

Between the rollers described above is a series of thin (for example, .032 inches) rolling disc knives located parallel to each other and transverse from left to right across the work stock. These rolling knives are adjustable both as to depth of cut and distance between cuts. Each knife of each pair of rolling knives is located in a relation to the other such that one disc knife cutting ahead of and at an angle (for example, 6 degrees) to its mate is offset to insure a slight overcut. Thus precise and positive grooves may be made in just one operation, at relatively high speed, at the jobsite thereby obtaining economies over prior devices.

Description of the Drawings

For the purposes of illustration a form of this invention is shown which is presently preferred.

FIG. 1 is an isometric view of the invention in its preferred form showing the horizontal slot through which the work stock is fed into the machine, the drive gear arrangement of the left hand end, and four adjusting levers for their respective rolling disc knives.

FIG. 4 is a side view of the B, C and D rolling disc knives showing the offset required for a positive overcut. The tool adjustment mechanism is also shown in this view.

FIG. 5 is a rear view of the tool shown in FIG. 4.

FIG. 6 is a side view of the lap cutting blades which, together with the edge tool prepares the lap joint on the fiberglass material left edge.

Description of the Preferred Embodiment

Figure 2:
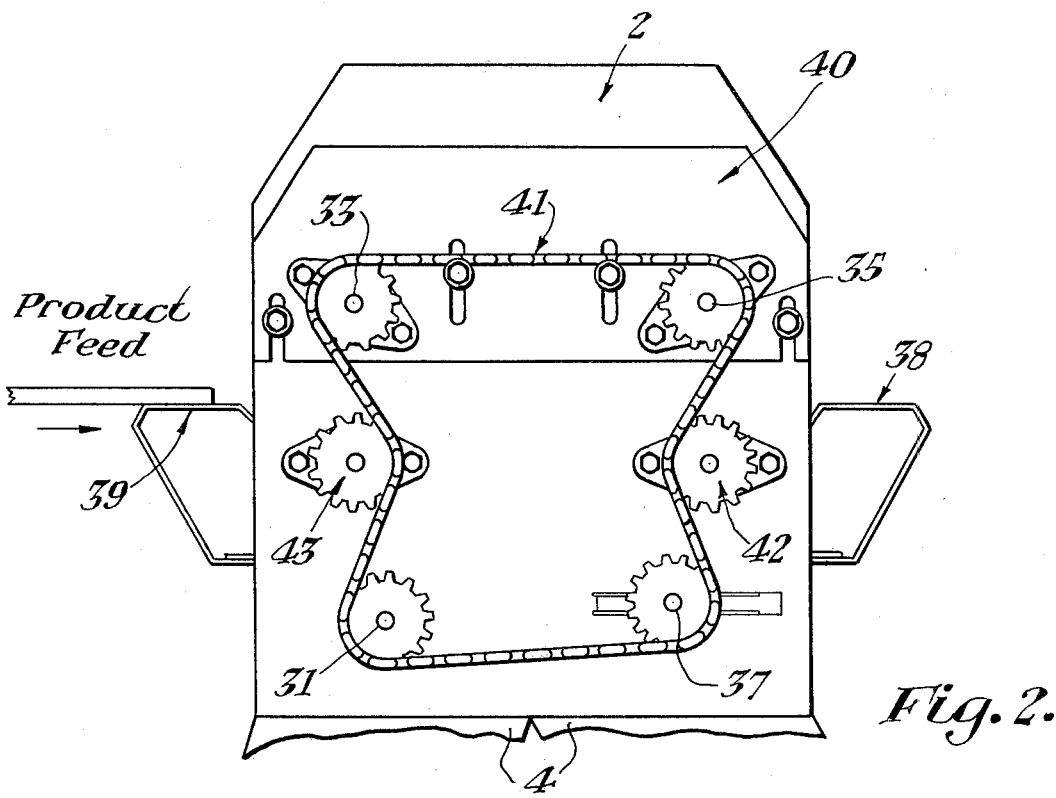
FIG. 2 is a view of the right end of the machine showing the driven and hold-down rollers together with the right end drive sprocket.

Referring now to the drawings in detail, wherein like numerals indicate like elements, there is shown in FIG. 1 a bench frame 1 which is a built-up composition of angle members traversing the machine left to right and laterally spaced parallel to one another leaving an opening for the rolling disc knives. At either end this bench frame 1 is spaced and supported by right end plate member 2 and left end plate member 3. These end plates are fabricated out of flat metal stock. Attached to end plate members 2 and 3 are four legs 4 fabricated from flat stock which has been bent at a right angle along each leg's longitudinal axis in order to provide rigidity and to support the bench frame 1 at a convenient working height above the floor.

Referring to FIGS. 3, 4, 5, and 6, the rolling disc knives 5, 6, and 7 are suspended vertically, their mounting plate 8 surfaces lying across the longitudinal axis of the bench frame 1 such that the knife cutting line is perpendicular to the bench frame 1 and supported below the tool mounting plate 8.

Referring to FIGS. 4 and 5 showing details of the rolling disc knives used to groove the fiberglass sheet stock, the fixed vertical post 9 is a tubular member affixed rigidly at its upper end to the tool mounting plate 8. Within this fixed post 9, a somewhat smaller adjusting post 10 is free to move vertically for the purpose of adjusting the depth of groove cut. Once adjusted to proper height, this adjustable post 10 is held in place by tightening lock nuts 11. At the bottom of adjustable post 10 and affixed to the front and rear sides of post 10 are shaft bushings 12. These bushings 12 support the axes of the rolling disc knives 13 and 13' to provide an angle of 86° between the knives' 13 and 13' axes. This results in the most efficient cutting action in that the intersection of the respective knives cutting lines provide an overcut at the apex of the intended groove, to insure a flawless waste extract.

Referring to FIGS. 4, 5 and 6, the edge of each disc knife 13 and 13' is ground at an angle of 15° to the external surface of the disc in order to force the product waste away from the work. In addition, at the end of the bushings 12 opposite the knives 13 and 13' and mounted on the knives' turning shaft is the knife wear adjustment spacer washers 14. Referring to FIG. 6, each disc knife 46 and 47 is ground at an angle of 15° to the external surface of the disc to prevent longitudinal creep.

Referring to FIG. 6, the "A" tool 5 is shown. The construction of this rolling disc knife, again is similar to tools B, C, D, and E described above in that this tool is vertically and longitudinally adjustable. This pair of rolling disc knives 46 and 47 is mounted in the vertical plane on a shaft passing through the lower end of the vertical adjusting post 9. Disc knife 47 nearest the bench frame 1 left end is one half inch smaller in radius than the disc knife 48 on the opposite end of the shaft. Located at right angles to and behind the vertical half of the "A" tool of FIG. 6 are the lap cutting blades 23 and 23'. These blades cut the fiberglass stock on an intersecting line transverse to the cut made by the "A" tool described above. In this way a shiplap is created which is used to seal the duct. Between the two disc knives 46 and 47 is a flat stainless steel deflector 48 which prevents the waste from binding between the blades 46 and 47.

Both the top 23 and bottom 23' blades have 36 teeth with no set, and are shapened with a 15° bevel from the lower surface to the top surface, on the leading edge of each tooth. Both blades turn into the product at a rate of 36 teeth/6 inches by virtue of the drive mechanism described below.

Figure 3:
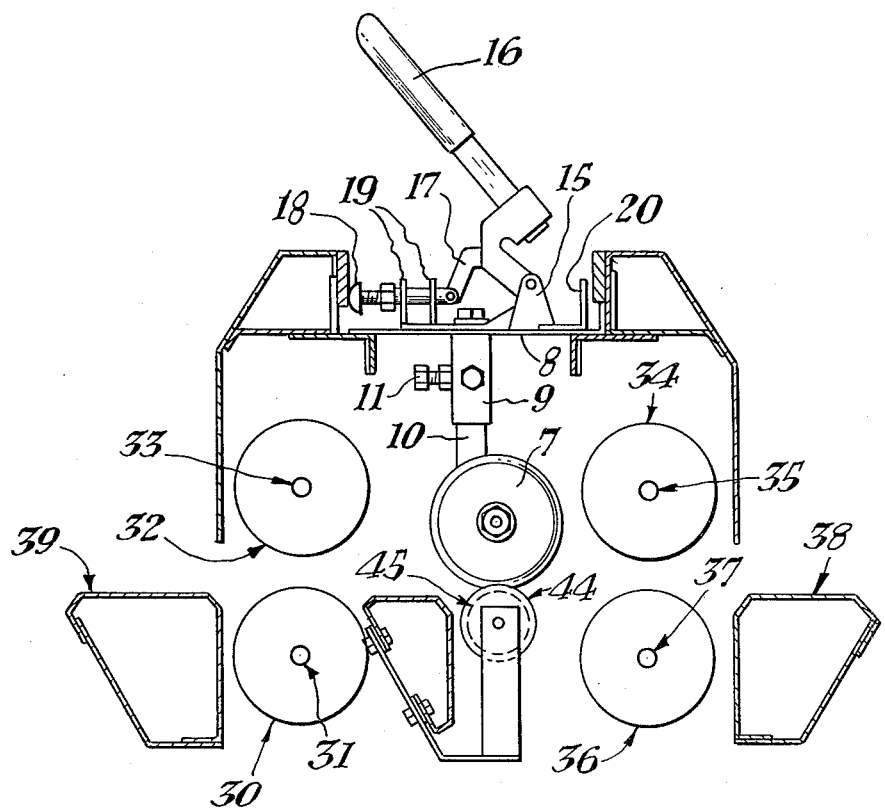
FIG. 3 is a cross-sectional view of the right edge "E" tool in FIG. 1, taken along Lines A—A, looking in the direction of the arrows.

Referring to FIG. 3 showing details of the "E" tool rolling disc knife 7 and female back-up roller 44 used to cut the product at desired total product extension, the fixed vertical post 9 remains as described above, except that correction of disc wear is accomplished by vertically adjusting the adjusting post 10.

The "E" tool disc knife 7 cutting edge is ground at 15° to each surface to produce equal pressure on either side of the knife edge.

In rolling communication with the "E" tool disc knife is the female back-up roller 44. This roller 44 is equipped with a notch .072" wide through which passed the "E" tool knife disc cutting edge. The roller 44 is supported by a bracket equipped with rollers for easy longitudinal adjustment along the bench frame 1.

Referring to FIGS. 2 and 3 the drive means used for advancing the work stock through the machine is shown. The driven sprocket 37 is powered by an electric motor or other suitable drive means. From driven sprocket 37 power is transmitted by virtue of link chain 41 to bottom sprockets 42 and 43 and top sprockets 33 and 35. Tension is adjusted by vertical movement of adjustment plate 40 to which upper sprockets 33 and 35 are attached.

Inside the machine as shown in FIG. 3 bottom roller 30 is connected to and turns with sprocket 43. Likewise, upper rollers 33 and 34, rotate on the shaft of their respective sprockets 33 and 35, and lower roller 36 rotates on the shaft with sprocket 42.

In actual operation the flat fiber board stock enters the machine supported by transverse member 39. Rollers 33 and 30 communicate with and force the flat stock through the properly positioned rolling disc knives. Then rollers 34 and 36 contact the flat fiber board and force the finished flat stock out of the machine onto transverse support member 38. It is seen that lower rollers 30 and 36 together with upper rollers 32 and 34 serve to not only force the flat fiber board through the machine's rolling disc knives but also to hold the fiber board relatively rigid and taut through the cutting section of the machine.

Above each tool mounting plate 8, a welded built-up vertical fulcrum 15 serves a tool locking handle 16. This fulcrum 15 is a bifurcated fork supporting the lever 16, a flat member, vertically between the furcations and holding the tool locking handle lever 16 in place by means of a pin through both furcations and the end of the tool locking handle 16. Moving outward from the fulcrum end toward the tool locking handle itself, a flat articulating member bent in a dog-leg 17 is fastened to the tool locking handle 16 at the member's one end, the other end fastened to a horizontal pin 18. As the tool locking handle 16 is lowered toward the bench frame 1, this pin 18, by virtue of its articulated connection 17, is brought into firm contact with an angle member of the bench frame 1 itself. In this way the tool is held in place to prevent longitudinal movement of the tool along the bench frame 1. The pin member 18 is guided to admit the pin 18, but to restrain the pins 18 to horizontal movement.

Ahead of the tool locking handle 16 and the fulcrum 15 about which it moves is a horizontal angle 20 running longitudinally along the top of the bench frame 1 and parallel to it. This angle 20 supports a tape measure to aid the operator in positioning the rolling disc knives 6 and 7 according to required inside-duct dimensions.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A portable one-pass machine for making duct from flat fiber board passing through the machine between the sides of the frame comprising:
    a frame including a first and second side;
    shiplap joint cutting knives for cutting a shiplap joint in the edge of the flat fiber board connected adjacent said first side of said frame,
    a plurality of thin rolling disc knives connected to said frame adjacent said shiplap joint cutting knives and along the width of said frame;
    an edge tool for cutting the flat fiber board to proper width adjustably connected adjacent said second side of said frame;
    connecting means for each of said rolling disc knives and said edge tool for transverse adjustment of said knives along the width of said frame;
    quick release locking means for locking and releasing each of said rolling disc knives and said edge tool from a position along siad frame;
    vertical adjusting means for vertical adjustment of each of said rolling disc knives to control depth of cut of said flat fiber board;
    wear adjusting means for adjustment to compensate for wear of each of said rolling disc knives; and
    drive means including drive rollers connected to said frame to advance the flat fiber board longitudinally through said machine past said roller disc knives and said edge tool, said drive rollers positioned for rolling contact with both the upper and lower surfaces of said fiber board.

2. A portable one-pass machine for making duct from flat fiber board passing through the machine between the sides of the frame, as set forth in claim 1 including, said shiplap cutting knives include a vertical cutting blade and a horizontal cutting blade, said horizontal shiplap cutting blade includes a plurality of teeth around the perimeter of said blade.

3. A portable one-pass machine for making duct from flat fiber board passing through the machine between the sides of the frame, as set forth in claim 2 including, said shiplap cutting knives include at least two horizontal blades and at least two vertical blades, the lower vertical blade includes a plurality of teeth around the perimeter of said blade with zero set in the teeth.

* * * * *